United States Patent [19]

Garreau

[11] Patent Number: 4,789,325
[45] Date of Patent: Dec. 6, 1988

[54] DEVICE SUITABLE FOR LENGTHENING OF LUMPS OF DOUGH

[76] Inventor: Claude Garreau, 2, Chemin des Platrieres, F-77113 Seine-Port, France

[21] Appl. No.: 65,309

[22] Filed: Jun. 22, 1987

[30] Foreign Application Priority Data

Jun. 20, 1986 [FR] France .................. 86 08898

[51] Int. Cl.$^4$ .................................. A21C 3/02
[52] U.S. Cl. ................................ 425/372; 425/383
[58] Field of Search .......... 26/51, 51.3, 51.4, 71, 26/72; 264/290.2; 426/502; 425/383, 371, 372, 335, 343

[56] References Cited

U.S. PATENT DOCUMENTS

| | | | |
|---|---|---|---|
| 2,196,006 | 4/1940 | Benedict | 426/335 |
| 2,334,022 | 11/1943 | Minich | 26/72 |
| 2,335,313 | 11/1943 | Rowe et al. | 264/282 |
| 2,482,270 | 9/1949 | Grundy | 26/51 |
| 2,545,667 | 3/1951 | Malnati | 83/110 |
| 2,618,012 | 11/1952 | Milne | 26/72 |
| 2,746,403 | 5/1956 | Hansen | 426/502 |
| 2,841,820 | 7/1958 | Pfeiffer | 26/72 |
| 3,298,888 | 1/1967 | Page et al. | 425/371 |

FOREIGN PATENT DOCUMENTS

| | | |
|---|---|---|
| 22937 | 10/1979 | Australia . |
| 857418 | 1/1977 | Belgium . |
| 1190897 | 4/1965 | Fed. Rep. of Germany ...... 425/372 |
| 2208381 | 9/1973 | Fed. Rep. of Germany ...... 425/371 |
| 7174 | 6/1916 | United Kingdom . |
| 972782 | 10/1964 | United Kingdom . |
| 2161417 | 1/1986 | United Kingdom . |

Primary Examiner—Willard Hoag
Attorney, Agent, or Firm—Horst M. Kasper

[57] ABSTRACT

Device permitting the continuous lengthening of lumps of dough or of sections thereof, of about one and a half to twice their initial length, without any manual intervention either at the input or the output.

This device is constituted by an endless lower belt (4), the lateral edges of which displace themselves in a divergent manner from the input toward the output, that is to say, a belt conceived in a manner that, during the course of its displacement, it becomes larger toward the output and, on the other hand, becomes smaller from the output toward the input, and by a similar upper belt (5), which is however slightly shorter at the input in order to allow for the feeding of the measured lumps of dough to be lenghtened, said upper belt (5) being space-adjustably mounted in comparison to the lower belt (4) by producing a slope that is descending and converging toward the output (S), and being driven in the sense toward the output at a slightly slower speed than that of the upper belt (4), likewise driven in the sense of the output (S), with these different displacement speeds being regulated in such a way that the lumps of dough being lengthened turn slowly over themselves.

7 Claims, 2 Drawing Sheets

DEVICE SUITABLE FOR LENGTHENING OF LUMPS OF DOUGH

The present invention relates to a device suitable for lengthening of lumps of dough and, more particularly, a device which permits a continuous lengthening of lumps of dough or sections thereof by about one to two and a half time their initial length without any manual intervention between the input and the output of the device.

In the current state of the art in the bakery field, the lumps of dough are generally lengthened by rolling them on themselves between a lower conveyor belt having lateral parallel edges or made up of parallel belt strips and an upper stationary belt capable of being moved closer or farther from the top of the lower belt according to the diameter or the length desired for the elongated lump of dough. This arrangement is not entirely satisfactory as far as the balanced elongation of the lumps of dough is concerned, since the dough does not always spread towards the lateral edges of the belt in the same manner during rolling. A device for the lengthening of lumps of dough is also known which uses large-diameter rotary disks mounted on swivel-joint roller bearings in a divergent manner in the direction of the output of the device, said disks being covered over approximately half of their periphery by an adjustable spacing sheet to allow for the passage of the lumps of dough between the said sheet and the circumferential edges of the disks. With this device, the rolling as well as the elongating of the lumps of dough is executed fairly well since the disks tend to stretch the dough at the same time as they cause a perpendicular decrease in diameter of the lump of dough. However, an inconvenience arises because, at their output from the device, the elongated lumps of dough still carry grooves marked by the placing of the disks.

The present invention tends to overcome these inconveniences of earlier devices by the concept of causing a progressively very combined rolling and stretching of the lumps of dough over a relatively long distance, the lumps of dough rolling slowly over themselves during the elongation.

According to the present invention, the device for the lengthening of lumps of dough is noteworthy in that it is made up of a lower feed belt, the lateral edges of which displace themselves in a diverging manner from the input to the output, that is to say, a belt conceived in such a way that, during the course of its displacement, it widens from the input toward the output and, inversely, narrows from the output toward the input, and of a similar upper belt which, however, is slightly shorter at the input to allow for the feed of the calibrated lumps of dough to be elongated. The upper belt is mounted adjustably spaced with respect to the lower belt to produce a descending and converging slope toward the output and is driven in the direction of the output at a slightly lesser speed than that of the lower belt, which is likewise driven in the direction of the output. The belt speeds are adjusted in such a way that the lumps of dough slowly turn over themselves during the process of elongation.

More specifically, each one of the lower and upper belts is made up of T-belt strips, the lower ribbings of which are guided in a divergent manner from the input toward the output of the device by grooves cut in an intermediary platform situated longitudinally between the drive and tension rollers of the belt strips, the latter being moreover covered by a fabric strip.

According to another mode of realization, each belt is made up of platelet chains disposed in the same manner as the belt strips divergent from the input toward the output of the device, with each chain having its platelets covered by an endless fabric strip that is perceptibly flexible and elastic.

According to another mode of realization, the belt strip assembly of each belt is covered by a single strip of fabric, which is loose-knit and/or very elastic crosswise, the lateral edges of said strip being fixedly disposed at the extreme lateral belt strips. It should be noted that said strip can furthermore be fixedly disposed at the central belt strip and at other intermediary belt strips in order to perfect its drive and its progressive enlargement.

According to another mode of realization, each belt can be made up by a single strip which is crosswise elastic and provided with initially parallel lower ribbings adapted to penetrate and be guided divergently from the input toward the output of the device by the grooves of the platform.

Moreover, one should note that, in all of these modes of realization, the belts are conceived in such a way as to attain at the output of the device a width of approximately one and a half times to twice their initial width at the input. Furthermore, said belts are preferably installed in a descending slope from the input toward the output of the device in order to facilitate their progress by gravity toward the output although they are displaced in this direction by the belts that enclose them.

Other characteristics of the present invention will become apparent in the following description of one mode of realization of the device in accordance with the invention, given by way of non-limiting example, and schematically shown in the annexed drawing, in which:

Figure 1:
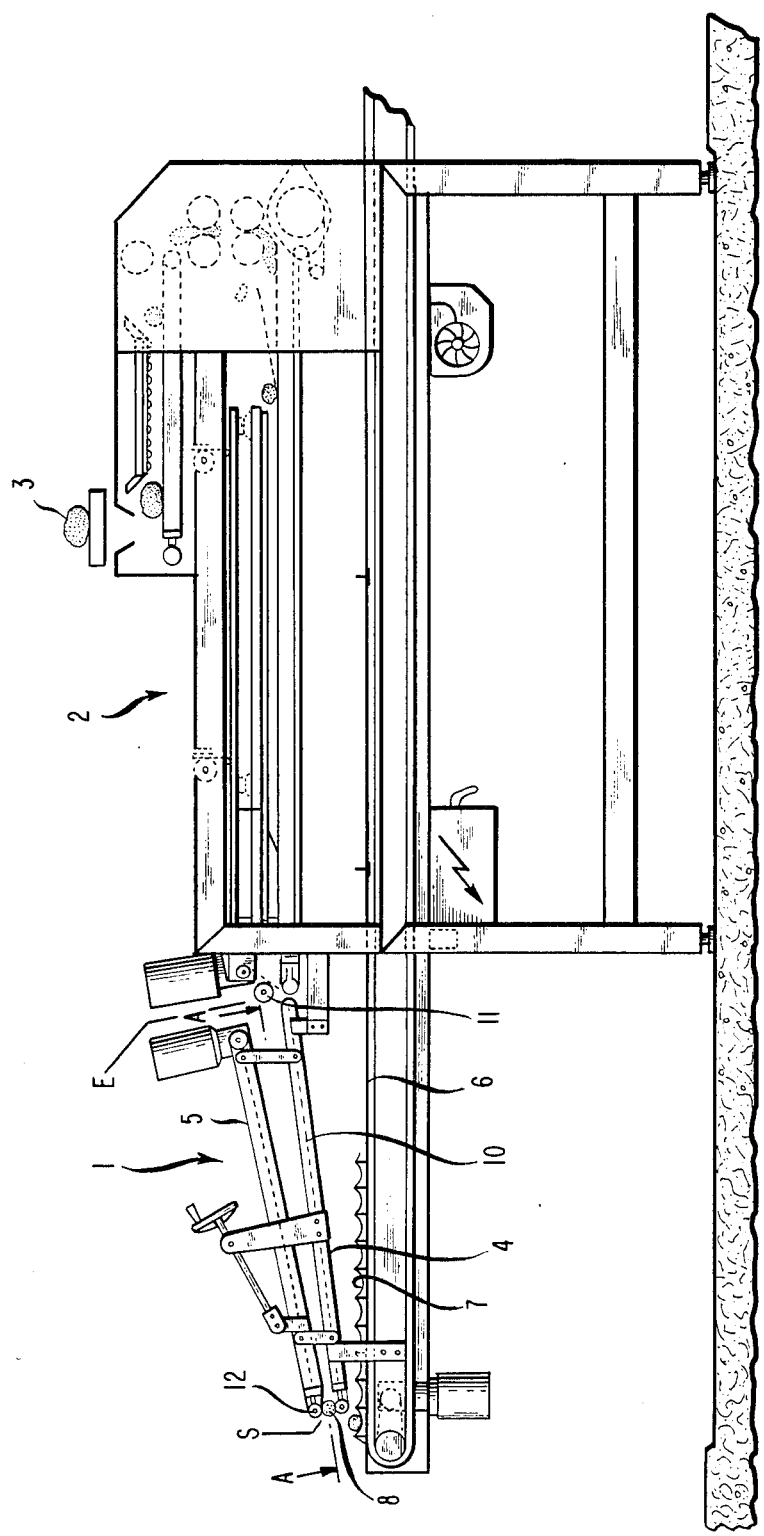
FIG. 1 is an elevational view of the device in accordance with the invention, extending a dough-lump measuring device.

As can be gathered from these figures, the device for the lengthening of lumps of dough, reference 1 in general, extends an apparatus 2 suitable for measuring of lumps of dough and for possibly cutting them into sections (for small breads), by starting out with one ball of dough 3. This device 1, according to the invention, is constituted by a lower belt 4 and an upper belt 5, mounted in such a way that its distance is adjustable in a convergent manner from the input E toward the output S of the device, with the upper belt 5 being slightly shorter at the input E than the lower belt 4 in order to provide a feed range for the measured lumps of dough coming from the apparatus 2. These belts 4, 5 are moreover mounted in a descending slope from the input E toward the output S in order to discharge onto a conveyor 6 that can, as shown, feed the netting 7 or, still, transport the lengthened lumps of dough 8 toward another production stage of the bread.

Figure 2:
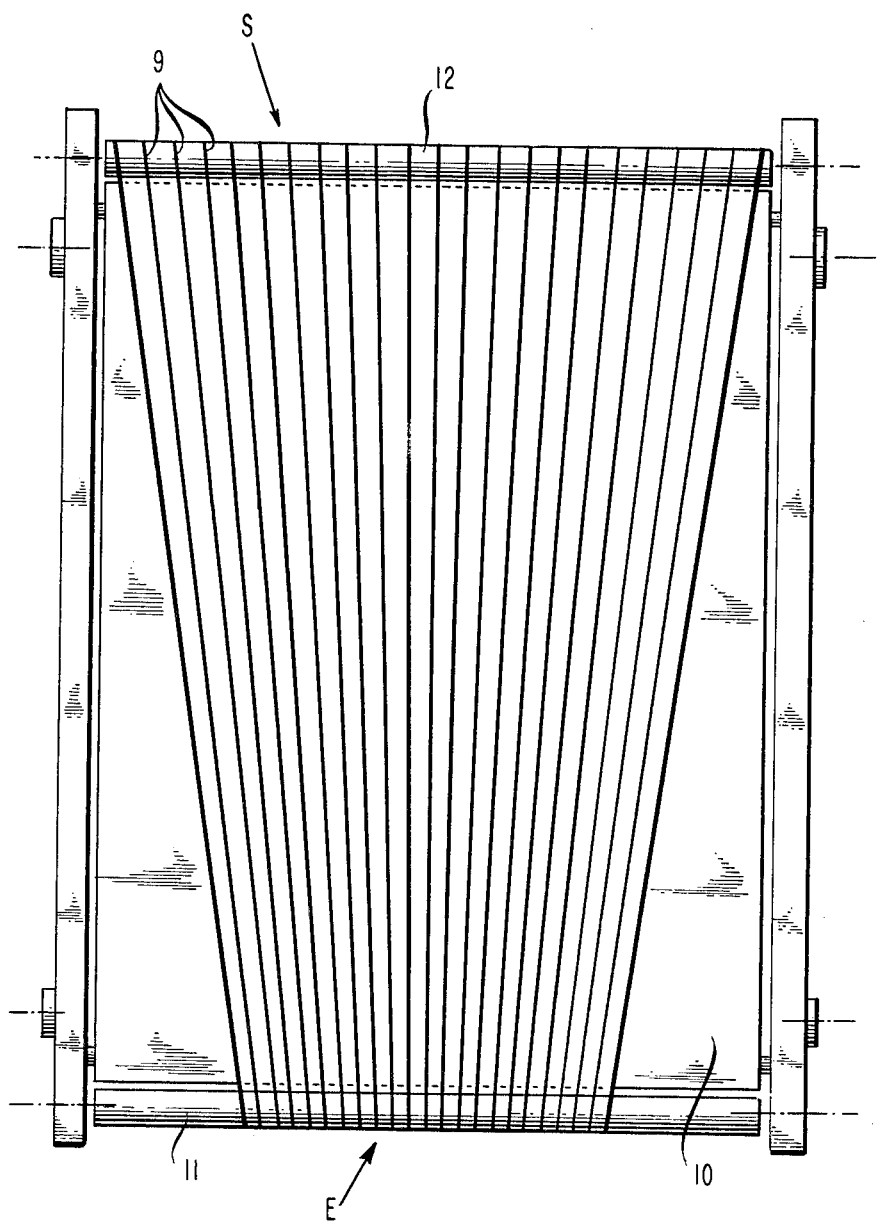
FIG. 2 is a plan-view of the lower belt of the device, viewed in the direction of line AA of FIG. 1.

As can be better gathered from FIG. 2, which shows a plan-view of the lower belt 4, with the upper belt 5 having the same structure, these belts are made up of mounted endless belt strips 9 which displace themselves in a divergent manner from the input E toward the output S. The belt strips 9 have a T-section and their lower ribbing is guided into divergent grooves cut in an intermediary platform 10 situated between the drive roller 11 and the tension roller 12 of the belt strips.

As shown in this FIG. 2, the belt strips at the output S cover a width equal to not quite twice the width that they cover at the input E.

One can now easily understand the functioning of the device according to the invention if one takes note that, as previously stated, the upper belt 5 displaces itself at a slightly slower speed than that of the lower belt 4. In fact, if a measured lump of dough, supplied by the apparatus 2, arrives at the input E on the lower belt 4, it is immediately carried along by the latter under the upper belt 5, so that it finds itself gripped between the two belts. Then, carried along by these two belts, the lump of dough undergoes a progressive flattening owing to the fact that the spacing between the belts converges toward the output, at the same time as a stretching due to the diverging displacement of the belt strips constituting these belts, as well as a rolling over itself due to the different displacement speed of the belts. Owing to the fact that these belts are conceived relatively long, the lengthening of the measured lumps of dough is very progressive, so that no tearing or striction effect of the dough is to be feared, the decrease of the dough-lump diameter by rolling supplying by itself the compensation of the lengthening produced by the stretching.

I claim:

1. In a device having plural cooperating belt pairs in side by side position suitable for lengthening of previously measured lumps of dough and constituted by two superimposed conveyor belts having an adjustable spacing passage there between for the lumps of dough converging from the input toward the output, each side by side set of belts being mounted in such a way that its lateral edges diverge in its forward sense, upper and lower belts being movable at different speeds the upper belt having a slightly lesser forward speed than the lower belt, the improvement wherein each of the lower belt sets and the upper belt sets are constituted by endless fabric belt strips guided from the input to the output by diverging grooves cut in an intermediary platform situated longitudinally between the drive roller and the tension roller of the belt strips, which belt strips are covered with fabric strips.

2. Device according to claim 1, wherein a further improvement comprises each belt strip being formed a T-section, remote surfaces of the belt being ribbed and engaged in the corresponding guide grooves of the intermediary platform and facing surface of the belts being covered by an endless fabric strip that is perceptibly flexible and elastic.

3. Device according to claim 2, wherein the further improvement includes the belt strip of each belt being covered by one single endless fabric strip, which is loose meshed, and very elastic crosswise, the lateral edges of this strip being fixed to the extreme lateral belt strips.

4. Device according to claim 3, wherein the improvement includes the single fabric strip being fixed, in addition to its lateral edges to the extreme lateral belt strips, to a central belt strip as well as to other intermediary belt strips in order to perfect its carrying along and its progressive widening from the input toward the output of the device.

5. Device according to claim 1, wherein a further improvement includes the belt strip of each belt being constituted as a single, crosswise elastic strip, and provided with initially parallel lower ribbings on surfaces remote from the dough suitable for penetrating and being guided by the grooves of the platform divergent from the input toward the output of the device.

6. Device according to claim 5, wherein a further improvement includes the belts disposed in such a way that the output end of the device is about one and a half as wide as the width of the input end.

7. Device according to claim 6, wherein the belts are positioned in a descending slope from the input toward the output.

* * * * *